United States Patent Office 3,379,646
Patented Apr. 23, 1968

3,379,646
SURFACE-ACTIVE AGENTS, PROCESS FOR
THEIR PREPARATION AND THEIR USE
Grégoire Kalopissis and André Viout, Paris, and Guy
Vanlerberghe, Mitry-Mory, France, assignors to Societe
Anonyme dite: l'Oreal, a corporation of France
No Drawing. Original application Feb. 26, 1964, Ser. No.
347,397. Divided and this application Oct. 3, 1966, Ser.
No. 611,485
Claims priority, application France, Mar. 1, 1963,
926,440, Patent 1,419,574
9 Claims. (Cl. 252—152)

ABSTRACT OF THE DISCLOSURE

A method of shampooing hair and shampoo compositions containing:

$$R'-NH-\underset{COOH}{CH}-CH_2CO-N-\underset{R_3}{CH}-CH_2CO-NH-(CH_2)_n-N\underset{R_2}{\overset{R'}{\diagup}}$$
$$\phantom{R'-NH-CH-CH_2CO-N-}COOH$$

which prevent accumulations of electrostatic charges, impart a soft handle to hair and which do not irritate the mucous membrane of the eye.

---

This application is a division of U.S. application Serial No. 347,397, filed February 26, 1964.

This invention relates to surface-active compounds of amphoteric character and processes for their preparation.

This is an improvement over the invention disclosed in U.S. application Ser. No. 256,142, filed February 4, 1963, now abandoned, and U.S. application Serial No. 487,084 filed September 13, 1965, in the name of Gregoire Kalopissis and Andre Viout which describes asparagine derivatives having surface active activity and which can be used in shampoos which conforms to the formula:

$$HN-\underset{R_3}{CH}-CH_2CO-NH-(CH_2)_n-N\underset{R_2}{\overset{R_1}{\diagup}}$$
$$\phantom{HN-CH-}COOH \qquad\qquad I$$

and their acid addition and sodium, potassium and ammonium salts, in which $R_1-N-R_2$ is selected from the group consisting of lower dialkyl amino in which $R_1$ and $R_2$ have 1 to 4 carbon atoms, morpholino and piperidino, $n$ is 2 to 5, preferably 2 or 3, and $R_3$ is an aliphatic hydrocarbon residue containing 10 to 18 carbon atoms.

It has now been found according to the present invention that related compounds containing additional fatty amine and carboxylic acid groups provide products which are particularly useful in the hair shampoo field.

The compounds of the present invention are compounds of the formula:

$$R'-NH-\underset{COOH}{CH}-CH_2CO-N-\underset{R_3}{CH}-CH_2CO-NH-(CH_2)_n-N\underset{R_2}{\overset{R_1}{\diagup}}$$
$$\phantom{R'-NH-CH-CH_2CO-}COOH \qquad\qquad II$$

and their acid addition salts, in which $R_1-N-R_2$ is selected from the group consisting of lower dialkyl amino morpholino and piperidino, $n$ is 2 to 5, and $R_3$ and R' are the same or different aliphatic hydrocarbon residues containing 10 to 18 carbon atoms each.

These new products have the following advantages. They possess good surface-active properties so that they can be used as hair shampoos, over a very wide pH range, for example from 3 to 10. In addition to their good detergent properties, they have the advantage of preventing the accumulation of electrostatic charges, impart a soft handle to the hair and permit ready combing. They are very well tolerated by the mucous membrane of the eye.

They possess very good thickening power and consequently can be employed as additives to aqueous solutions of other surface-active substances of cationic, anionic or non-ionic character. The last advantage is very appreciable in practice owing to the fact that the thickening is effected by substances which can themselves be used alone as shampoos, in contrast to known products, which are not both thickening and washing agents.

The process for the preparation of the new compounds according to the invention consists in condensing maleic anhydride with the asparagine derivatives, described in the aforesaid application, of the Formula I, and thereafter adding a fatty amine of formula $R'NH_2$ to the double bond of the resultant product.

As particularly suitable fatty amines, there may be mentioned: decylamine and dodecylamine, and also the amines derived from the fatty acids of copra and tallow.

The invention includes within its scope washing and cleaning compositions, in particular shampoos having a pH of from 3 to 8 which contains one or more compounds of the Formula II.

These compositions may be in the form of aqueous solutions and their pH may be acid, neutral or alkaline. The compounds of Formula II function either as cationic or anionic agents, depending upon the pH.

As already stated, aqueous solutions of the compounds of Formula II are innocuous to the mucous membrane of the eye. This has been shown by tests carried out by applicants, summarized in the following tables.

TABLE I

Application of a solution of:

$$R_3-N-\underset{\underset{R'-NH}{CO-CH_2-CH-COONa}}{\underset{|}{CH-COONa}}\underset{}{\phantom{x}}\underset{}{\phantom{x}}\overset{CH_2-CO-NH(CH_2)_3-N\overset{C_2H_5}{\underset{C_2H_5}{\diagup}}}{}$$

$R_3=R'=$alkyl residues from copra fatty acids at a concentration of 0.05 M (M.W.=816).

| pH | Rabbits | Observation 24 hours after application | Observation 7 days after application |
|---|---|---|---|
| pH 3 | 1 | 1 | Recovered |
|  | 2 | 1 | Recovered |
|  | 3 | 1 | Recovered |
|  | 4 | 1 | Recovered |
| pH 7 and pH 8 | 1 | 0 | 0 |
|  | 2 | 0 | 0 |
|  | 3 | 0 | 0 |
|  | 4 | 0 | 0 |

TABLE II

Application of a solution of:

$$R_3-N-\underset{\underset{R'-NH}{CO-CH_2-CH-COONa}}{\underset{|}{CH-COONa}}\underset{}{\phantom{x}}\underset{}{\phantom{x}}\overset{CH_2-CO-NH(CH_2)_3-N\overset{CH_3}{\underset{CH_3}{\diagup}}}{}$$

$R_3=R'=$alkyl residues from copra fatty acids at a concentration of 0.05 M (M.W.=703).

| pH | Rabbits | Observation 24 hours after application | Observation 7 days after application |
|---|---|---|---|
| pH 3 | 1 | 0 | 0 |
|  | 2 | 1 | Recovered |
|  | 3 | 0 | 0 |
|  | 4 | 0 | 0 |
| pH 7 | 1 | 0 | 0 |
|  | 2 | 0 | 0 |
|  | 3 | 0 | 0 |
|  | 4 | 0 | 0 |

TABLE III

Application of a solution of:

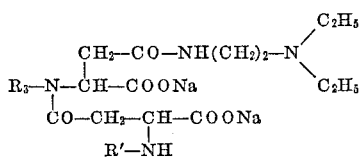

$R_3=R'=$alkyl residues from copra fatty acids at a concentration of 0.05 M (M.W.=744).

| pH | Rabbits | Observation 24 hours after application | Observation 7 days after application |
|---|---|---|---|
| pH 3 | 1 | 0 | 0 |
|  | 2 | 0 | 0 |
|  | 3 | 0 | 0 |
|  | 4 | 0 | 0 |
| pH 7 | 1 | 0 | 0 |
|  | 2 | 0 | 0 |
|  | 3 | 0 | 0 |
|  | 4 | 0 | 0 |

TABLE IV

Application of a solution of:

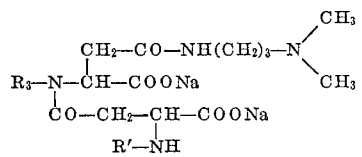

$R_3=R'=$alkyl residues from tallow fatty acids at a concentration of 0.05 M (M.W.=882).

| pH | Rabbits | Observation 24 hours after application | Observation 7 days after application |
|---|---|---|---|
| pH 3 | 1 | 0 | 0 |
|  | 2 | 0 | 0 |
|  | 3 | 0 | 0 |
|  | 4 | 0 | 0 |
| pH 7 | 1 | 0 | 0 |
|  | 2 | 0 | 0 |
|  | 3 | 0 | 0 |
|  | 4 | 0 | 0 |

TABLE V

Application of a solution of:

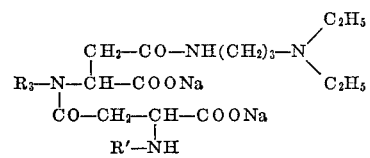

$R_3=R'=$alkyl residues from tallow fatty acids at a concentration of 0.05 M (M.W.=910).

| pH | Rabbits | Observation 24 hours after application | Observation 7 days after application |
|---|---|---|---|
| pH 3 | 1 | 0 | 0 |
|  | 2 | 0 | 0 |
|  | 3 | 0 | 0 |
|  | 4 | 0 | 0 |
| pH 7 and pH 8. | 1 | 0 | 0 |
|  | 2 | 0 | 0 |
|  | 3 | 0 | 0 |
|  | 4 | 0 | 0 |

TABLE VI

Application of a solution of:

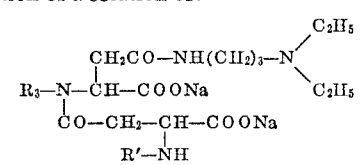

$R_3=$alkyl residue from tallow fatty acids and $R'=$alkyl residue from copra fatty acids in a concentration of 0.05 M (M.W.=834).

| pH | Rabbits | Observation 24 hours after application | Observation 7 days after application |
|---|---|---|---|
| pH 3 | 1 | 0 | 0 |
|  | 2 | 0 | 0 |
|  | 3 | 0 | 0 |
|  | 4 | 0 | 0 |
| pH 7 and pH 8. | 1 | 0 | 0 |
|  | 2 | 0 | 0 |
|  | 3 | 0 | 0 |
|  | 4 | 0 | 0 |

TABLE VII

Application of a solution of:

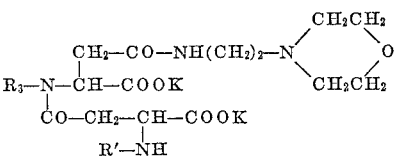

$R_3=R'=$alkyl residues from copra fatty acids at a concentration of 0.05 M (M.W.=790).

| pH | Rabbits | Observation 24 hours after application | Observation 7 days after application |
|---|---|---|---|
| pH 3 | 1 | 1 | Recovered |
|  | 2 | 1 | Recovered |
|  | 3 |  |  |
|  | 4 | 1 | Recovered |
| pH 7 | 1 | 0 | 0 |
|  | 2 | 1 | Recovered |
|  | 3 | 1 | Recovered |
|  | 4 | 0 | 0 |
| pH 8 | 1 | 0 | 0 |
|  | 2 | 1 | Recovered |
|  | 3 | 0 | 0 |
|  | 4 | too weak | Recovered |

The symbols employed in these tables have the following meanings:

0 = no irritation;
1 = irritation of the bulbar or palpebral conjunctiva;
2 = irritation of both the bulbar and palpebral conjunctivae;
3 = 2 plus watering (recovery);
4 = 3 plus non-purulent secretion (recovery);
5 = 4 plus purulent secretion, closing of the eyelids, roughened cornea with possible insensitivity (recovery slow, but possible);
6 = 5 plus attack on the palpebral edges and even on the skin.

Numbers 1 to 6 may be followed by 1 to 5 crosses in accordance with the intensity of the action; since the corneal lesions are of two types, the numbers corresponding to the strongest action may also be followed by (a), which corresponds to a loss of lustre (roughened cornea), or (b), which corresponds to the more or less complete destruction of the corneal epithelium with more or less extensive ulceration and loss of corneal sensitivity. The cornea may be attacked in cases 5 and 6 either by the product itself or by the pathological conjunctival secretion produced by the product. Loss of corneal sensitivity facilitates the production of ulceration.

It is clearly apparent from the tests summarized in the foregoing tables that the products of the invention do not attack the cornea, as do many known cationic, anionic and non-ionic products. By way of comparison, it is to be noted that the application of solutions of the same concentration by weight and with the same pH, of cetyltrimethylammonium bromide to the eye of rabbits gives lesions which would be placed between 3 and 6 in the foregoing scale.

The new compounds may be employed in various fields and notably in the cosmetic field. As already stated, they may be employed with advantage for thickening hair washing compositions.

The following examples illustrate the preparation of the new chemical compounds, and also the compositions of the invention.

EXAMPLES OF THE PREPARATION OF THE NEW COMPOUNDS

Example 1

Preparation of the disodium salt of $N^2$-(alkyl, aspartyl)-aspargine of the formula:

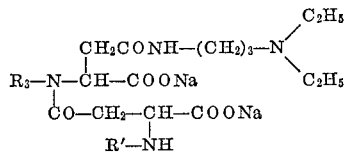

in which $R_3$ and $R'$ represent aliphatic hydrocarbon residues derived from fatty acids of copra.

To a solution of 1 mole of the sodium salt of N-(N',N'-diethylaminopropyl) - $N^2$ - (alkyl)asparagine of the formula:

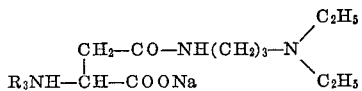

in which $R_3$ is an alkyl residue derived from the fatty acids of copra, in 300 cc. of tert.butyl alcohol, is added, at a temperature of 50° C. with stirring, 1 mol. of maleic anhydride. The whole is maintained at this temperature for about 1 hour. The temperature is then allowed to return to normal, and neutralization is effected by means of concentrated aqueous sodium hydroxide solution. 1 mol. of copra fatty amine is thereafter added and the mixture is heated for 12 hours at 65° C. with stirring. The solution is evaporated in vacuo. The product obtained is substantially colorless and can be reduced to flakes by grinding. The progress of the reaction is observed with the usual analytical determinations carried out both on the intermediate and final products. It is thus possible to determine the point of disappearance of the primary amine employed, owing to the fact that the final product contains only 2–4% thereof.

Example 2

Preparation of the disodium salt of $N^2$ - (alkyl), aspartyl)-asparagine of the formula:

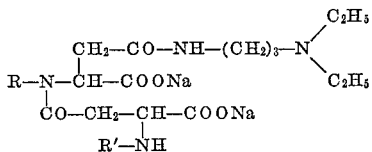

in which R and R' represent alkyl residues derived from the fatty acids of tallow.

The procedure of Example 1 is followed, but the amines derived from the fatty acids of tallow are employed instead of copra amines. The desired product is obtained in the form of a solid mass.

Example 3

Preparation of the disodium salt of $N^2$-(alkyl, aspartyl)-asparagine of the formula:

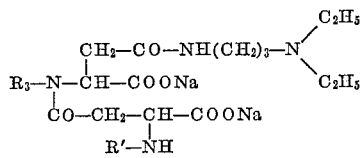

in which $R_3$ represents an alkyl residue derived from the fatty acids of tallow and R' represents an alkyl residue derived from the fatty acids of copra. The same procedure is followed as in Example 1, but starting with the sodium salt of N-(N',N'-diethylaminopropyl)-$N^2$-(alkyl) asparagine of the formula:

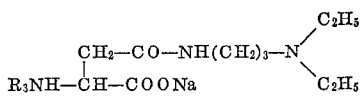

in which $R_3$, is an alkyl residue derived from the fatty acids of tallow. The product obtained takes the form of a solid mass which can be reduced to flakes by crushing.

Example 4

Preparation of the disodium salt of $N^2$-(alkyl, aspartyl)-asparagine of the formula:

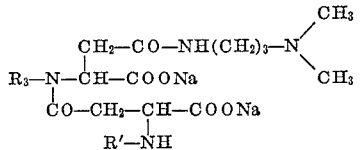

in which $R_3$ and R' represent the alkyl residues derived from the fatty acids of copra.

By proceeding in the same way as in Example 1, but starting with the sodium salt of N-(N',N'-dimethylaminopropyl)-$N^2$-(alkyl)asparagine of the formula:

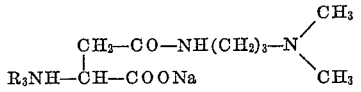

in which $R_3$ represents an alkyl residue derived from the fatty acids of copra, a substantially colorless solid product is obtained.

Example 5

Preparation of the disodium salt of $N^2$-(alkyl, aspartyl)-asparagine of the formula:

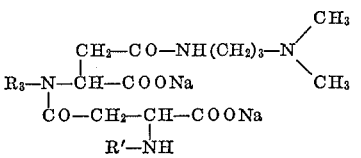

in which $R_3$ and R' represent alkyl residues derived from the fatty acids of tallow.

The same procedure is followed as in Example 4, but amines derived from the fatty acids of tallow are employed instead of copra fatty amines. After evaporation of the water and the alcohol, the desired product is obtained in solid form. It can be reduced to flakes by grinding.

Example 6

Preparation of the disodium salt of $N^2$-(alkyl, aspartyl)-asparagine of the formula:

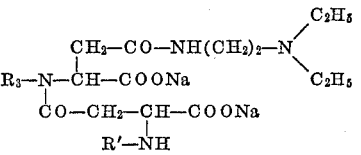

in which $R_3$ and R' represent alkyl residues derived from the fatty acids of copra.

The same procedure is followed as in Example 1, but starting with the sodium salt of N-(N',N'-diethylaminoethyl)-$N^2$-(alkyl)asparagine of the formula:

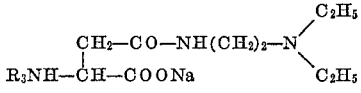

in which $R_3$ represents an alkyl residue derived from the fatty acids of copra.

The desired product is obtained by proceeding as in Example 1.

Example 7

Preparation of the dipotassium salt of $N^2$-(alkyl, aspartyl)-asparagine of the formula:

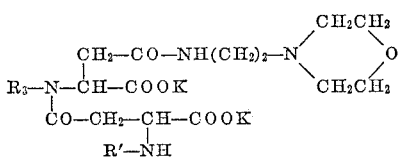

in which $R_3$ and $R'$ represent alkyl residues derived from the fatty acids of copra.

The same procedure is adopted as in Example 1 above, but starting with the potassium salt of N-(N'-morpholinoethyl)-$N^2$-(alkyl)asparagine of the formula:

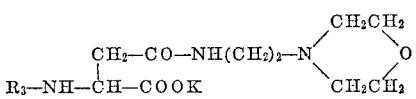

in which $R_3$ represents an alkyl residue derived from the fatty acids of copra. The desired product is obtained in the form of a solid mass which can be reduced to flakes by grinding.

EXAMPLES OF THE APPLICATION OF THE NEW COMPOUNDS

Example 8

There is prepared an aqueous solution containing:

| | G. |
|---|---|
| Disodium salt of $N^2$-[alkyl(copra)aspartyl]-$N^2$-[alkyl(copra)]-N-(N',N'-diethylaminopropyl)asparagine | 7 |
| $N^2$-[alkyl(copra)] - N - (N',N'-diethylaminopropyl)-asparagine | 6 |
| Lactic acid to pH 6. | |
| Water to 100 cc. | |

This solution gives a viscous shampoo which foams well and permits ready combing of the hair.

Example 9

There are mixed:

| | G. |
|---|---|
| Fatty alcohol ($C_{12}$–$C_{14}$) condensed with 12 mol. of ethylene oxide | 12 |
| Disodium salt of $N^2$-[alkyl(copra)aspartyl]-$N^2$-[alkyl(copra)] - N - (N',N' - diethylaminopropyl)asparagine | 6 |
| Lactic acid to pH 5. | |
| Water to 100 cc. | |

A shampoo of oily consistency is obtained, which imparts suppleness to the hair and makes it easy to comb. Moreover, the hair shows no electrostatic charge after treatment.

Example 10

There are mixed:

| | G. |
|---|---|
| Octylphenol condensed with 15 mol. of ethylene oxide | 8 |
| Diethanolamide of fatty acids of copra | 2 |
| Disodium salt of $N^2$-[alkyl(copra)aspartyl]-$N^2$-[alkyl(tallow)] - N - (N',N' - diethylaminopropyl)asparagine | 4 |
| Lactic acid to pH 7. | |
| Water to 100 cc. | |

An oily shampoo is obtained which leaves the hair soft and silky. In addition, no accumulation of electricity occurs on the hair.

Example 11

There are mixed:

| | G. |
|---|---|
| Branched-chain tridecyl alcohol condensed with 15 mol. of ethylene oxide | 7 |
| Diethanolamide of fatty acids of copra | 3 |
| Disodium salt of $N^2$-[alkyl(copra)aspartyl]-$N^2$-[alkyl(copra)] - N - (N',N' - dimethylaminopropyl)asparagine | 6 |
| Lactic acid to pH 3. | |
| Water to 100 cc. | |

This shampoo, which is of oily appearance, makes the hair easy to comb and renders it soft and silky.

Example 12

There are mixed:

| | G. |
|---|---|
| Lauryl alcohol condensed with 15 mol. of ethylene oxide | 8 |
| Diethanolamide of copra fatty acids | 2 |
| Disodium salt of $N^2$-[alkyl(copra)aspartyl]-$N^2$-[alkyl(copra)] - N - (N',N'-dimethylaminopropyl)asparagine | 5 |
| Lactic acid to pH 8. | |
| Water to 100 cc. | |

This shampoo, which has an oily consistency, leaves the hair soft and supple. It exhibits no accumulation of electrostatic charges after drying.

EXAMPLE 13

There are mixed:

| | G. |
|---|---|
| Sulphate of $C_{12}$–$C_{14}$ alcohols and of ammonium (expressed as active constituents) | 9 |
| Disodium salt of $N^2$-[alkyl(copra)aspartyl]-$N^2$-[alkyl(copra)]-N-(N',N'-diethylaminopropyl)asparagine | 1 |
| Lactic acid to pH 6.8. | |
| Water to 100 cc. | |

This shampoo imparts softness to the hair and avoids the accumulation of electrostatic charges.

What is claimed is:

1. A method of shampooing live human hair, which comprises the steps of applying thereto a shampoo consisting essentially of an aqueous solution having effective amounts of at least one amphoteric surface active agent having the formula

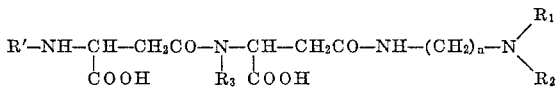

and their acid addition and sodium, potassium and ammonium salts, in which $R^1$—N—$R^2$ is selected from the group consisting of lower dialkylamino, morpholino and piperidino, wherein $n$ is 2 to 5, and at least one of $R_3$ and $R'$ are alkyls containing 10 to 18 carbon atoms.

2. The method of shampooing live human hair of claim 1, wherein an acid is added to said shampoo in amounts to give the shampoo a desired pH in the range of pH 3 to 8.

3. The method of shampooing live human hair, of claim 1, wherein said amphoteric surface active agent is a mixture of disodium salt of $N^2$-[(copra) aspartyl]-$N^2$-[(copra)]-N-(N',N'-diethylaminopropyl) asparagine and $N^2$-[(copra)]-N-(N',N'-diethylaminopropyl) asparagine.

4. The method of shampooing live human hair of claim 1, wherein said amphoteric surface active agent is disodium salt of $N^2$-[(copra)aspartyl]-$N^2$-[(copra)]-N-(N',N'-diethylaminopropyl) asparagine.

5. The method of shampooing live human hair, of claim 1, wherein said amphoteric surface active agent is disodium salt of $N^2$ - [(copra)aspartyl] - $N^2$ - [(tallow)] - N-(N',N'-diethylaminopropyl)asparagine.

6. The method of shampooing live human hair, of claim 1, wherein said amphoteric surface active agent is disodium salt of N²-[(copra) aspartyl]-N²-[(copra)]-N-(N',N'-dimethylaminopropyl) asparagine.

7. The method of shampooing live human hair, of claim 1, wherein said amphoteric surface active agent is disodium salt of N²-[(copra) aspartyl]-N²-[(copra)]-N-(N',N'-dimethylaminopropyl) asparagine.

8. The method of shampooing live human hair, of claim 1, wherein said amphoteric surface active agent is disodium salt of N²-[(copra) aspartyl]-N²-[(copra)]-N-(N',N'-diethylaminopropyl) asparagine.

9. A shampoo composition consisting essentially of an aqueous solution having effective amounts of at least one amphoteric surface active agent, having the formula:

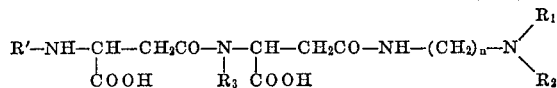

and their acid addition and sodium, potassium and ammonium salts, in which $R_1-N-R_2$ is selected from the group consisting of lower dialkyl amino, morpholino and piperidino, wherein $n$ is 2 to 5, and at least one of $R_3$ and $R_1$ are alkyls containing 10 to 18 carbon atoms, and having a pH between 3 and 10.

References Cited
UNITED STATES PATENTS

| | | | |
|---|---|---|---|
| 2,821,521 | 1/1958 | Price | 260—534 |
| 3,158,635 | 11/1964 | Kezerian et al. | 260—534 |

LEON D. ROSDOL, *Primary Examiner.*

S. D. SCHNEIDER, *Assistant Examiner.*